United States Patent
Lala et al.

(10) Patent No.: US 10,320,898 B2
(45) Date of Patent: Jun. 11, 2019

(54) AUTOMATED MULTI-NETWORK FAILOVER FOR DATA CENTERS

(71) Applicant: Verizon Patent and Licensing Inc., Arlington, VA (US)

(72) Inventors: Shailan Lala, Canton, MA (US); Thomas B. Edgar, Rochester, MI (US); Kalanithi Srinivasan, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 271 days.

(21) Appl. No.: 15/174,710

(22) Filed: Jun. 6, 2016

(65) Prior Publication Data

US 2017/0353544 A1    Dec. 7, 2017

(51) Int. Cl.
| | |
|---|---|
| G06F 15/177 | (2006.01) |
| H04L 29/08 | (2006.01) |
| H04L 12/26 | (2006.01) |
| H04L 12/703 | (2013.01) |
| H04L 12/24 | (2006.01) |
| H04L 29/14 | (2006.01) |
| H04L 12/803 | (2013.01) |

(52) U.S. Cl.
CPC ...... *H04L 67/1036* (2013.01); *H04L 41/0654* (2013.01); *H04L 43/0817* (2013.01); *H04L 43/0876* (2013.01); *H04L 45/28* (2013.01); *H04L 67/1034* (2013.01); *H04L 69/40* (2013.01); *H04L 47/125* (2013.01)

(58) Field of Classification Search
None
See application file for complete search history.

(56) References Cited

U.S. PATENT DOCUMENTS

| | | | | |
|---|---|---|---|---|
| 6,697,960 B1 * | 2/2004 | Clark | ................. | G06F 11/1469 714/15 |
| 7,933,198 B1 * | 4/2011 | Pan | ....................... | H04L 45/586 370/216 |
| 8,862,735 B1 * | 10/2014 | Singh | ..................... | H04L 63/20 709/221 |
| 9,842,042 B2 * | 12/2017 | Chhatwal | ............ | G06F 11/3664 |

(Continued)

OTHER PUBLICATIONS

Wikipedia, "Name server," https://en.wikipedia.org/wiki/Name_server, May 25, 2016, 4 pages.

*Primary Examiner* — Hamza N Algibhah
*Assistant Examiner* — Gregory P Tolchinsky

(57) ABSTRACT

A device may monitor a status of a first data center of a group of data centers. The device may determine, based on the status of the first data center, to cause a failover from the first data center to a second data center. The device may cause a domain name server (DNS) configuration, associated with an external DNS, to be and a set of DNS entries, associated with an internal DNS, to be altered to cause a portion of the network traffic, respectively associated with a first network and a second network of the plurality of networks, to be routed the second data center. The device may cause a load balancer configuration to be altered to cause a portion of the network traffic associated with a third network of the plurality of networks to be redirected from the first data center to the second data center.

20 Claims, 7 Drawing Sheets

(56) References Cited

U.S. PATENT DOCUMENTS

| | | | |
|---|---|---|---|
| 2005/0015657 A1* | 1/2005 | Sugiura | G06F 11/1482 |
| | | | 714/6.12 |
| 2008/0059487 A1* | 3/2008 | Mi | G06F 17/30327 |
| 2010/0211956 A1* | 8/2010 | Gopisetty | G06F 9/5088 |
| | | | 718/104 |
| 2011/0246813 A1* | 10/2011 | Collier | G06F 11/2035 |
| | | | 714/3 |
| 2011/0299387 A1* | 12/2011 | Eydelman | H04L 41/069 |
| | | | 370/225 |
| 2012/0221603 A1* | 8/2012 | Kothule | G06F 17/30566 |
| | | | 707/783 |
| 2012/0239792 A1* | 9/2012 | Banerjee | H04L 67/1097 |
| | | | 709/223 |
| 2012/0316882 A1* | 12/2012 | Fiumi | G10L 15/32 |
| | | | 704/270 |
| 2014/0279892 A1* | 9/2014 | Bourbonnais | G06F 17/30584 |
| | | | 707/633 |
| 2014/0379895 A1* | 12/2014 | Jain | H04L 41/0654 |
| | | | 709/224 |
| 2015/0339200 A1* | 11/2015 | Madduri | G06F 11/2028 |
| | | | 714/4.11 |
| 2016/0352588 A1* | 12/2016 | Subbarayan | H04L 69/16 |
| 2017/0126626 A1* | 5/2017 | Datta | H04L 61/00 |
| 2018/0063237 A1* | 3/2018 | Cui | H04L 67/1034 |

* cited by examiner

AUTOMATED MULTI-NETWORK FAILOVER FOR DATA CENTERS

BACKGROUND

A data center is a facility used to house computer systems and associated components, such as telecommunications and storage systems. A data center may include redundant or backup power supplies, redundant data communications connections, environmental controls (e.g., air conditioning, fire suppression), and various security devices. Multiple data centers may be established in different configurations (active/active configurations, active/standby configurations, etc.). When a data center fails, another data center may be used as a backup to prevent service interruption.

DETAILED DESCRIPTION OF PREFERRED EMBODIMENTS

Figure 1A:
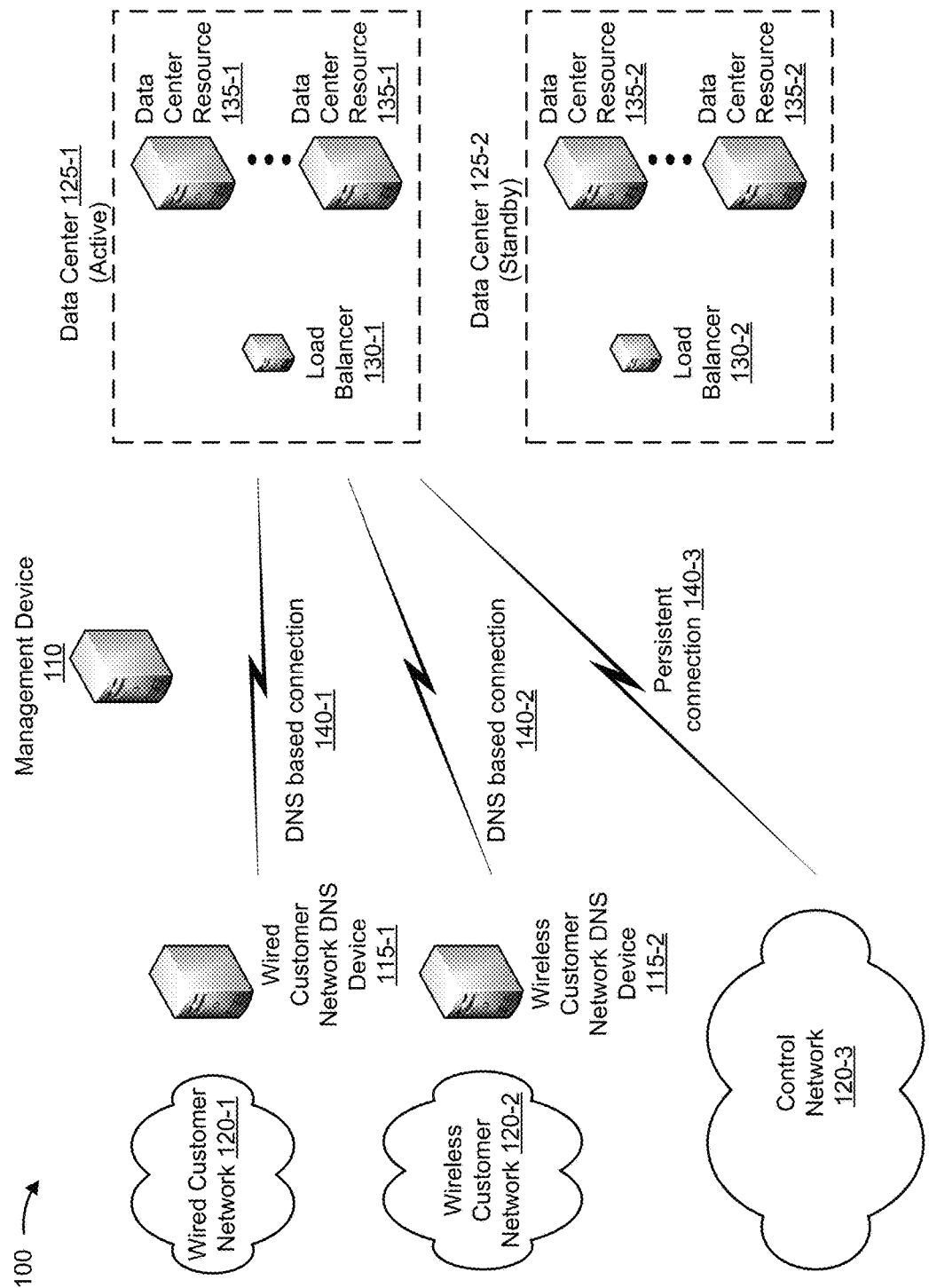
FIGS. 1A-1D are diagrams of an overview of an example implementation described herein.

The following detailed description of example implementations refers to the accompanying drawings. The same reference numbers in different drawings may identify the same or similar elements.

A service provider may establish redundant data centers (e.g., similar data centers that provide redundancy in an active/active configuration or an active/standby configuration). User devices may access the data centers to support the use of applications, games, websites, ecommerce web sites, application programming interfaces (APIs), or the like. For example, a user device may utilize a uniform resource locator (URL) to navigate a web browser application to a particular website and obtain information. The information may be stored by one of the redundant data centers, and the user device may connect to one of the redundant data centers using the URL. The user device may connect to the redundant data centers via different types of networks, such as a public Internet network (e.g., a connection via the Internet), a wireless communication provider network (e.g., a connection via a long term evolution (LTE) network), an intranet (e.g., an internal corporate network or an internal information technology (IT) network), or the like.

User experience may be adversely affected as traffic is routed between redundant data centers. For example, a user device may experience packet loss and/or other degraded network performance during traffic routing between redundant data centers. Further, applications may need to be customized to be compatible with a multiple data center configuration. Further, when multiple networks with multiple access points into the data centers exist, difficulties arise when synchronizing data for failover from a first data center to a second data center.

Implementations, described herein, may automatically adjust a set of domain name servers (DNSs) and/or a set of load balancers associated with a group of networks to fail over the group of networks from a first data center to a second data center. In some implementations, a health check procedure may be utilized to identify an issue with a connection of a particular network, of the group of networks, to the first data center, and may trigger failover for each network, of the group of networks, to the second data center based on identifying the issue with the connection of the particular network. In some implementations, DNS synchronization may be implemented to cause failover of multiple networks from a first data center to a second data center.

In this way, a likelihood of a user device experiencing degraded network performance resulting from an outage or an issue is reduced in relation to utilization of a failover procedure that does not synchronize failover for multiple networks. Further, altering the set of domain name servers to cause connection requests to be routed to the second data center rather than the first data center may reduce a quantity of hops associated with the connection requests relative to utilizing data center-side load balancing to perform failover routing. In this way, a quantity of transmitted messages may be reduced relative to data center-side load balancing associated with a greater quantity of hops, thereby reducing network traffic.

FIGS. 1A-1D are diagrams of an overview of an example implementation 100 described herein. FIG. 1A shows a management device 110, a set of DNS devices 115 associated with a set of networks 120, a set of data centers 125, a set of load balancers 130, a set of data center resources 135, and a set of connections 140.

The set of DNS devices 115 may include a wired customer network DNS device 115-1 (e.g., which may direct communications from a wired customer network 120-1, such as the Internet) and a wireless customer network DNS device 115-2 (e.g., which may direct communications from a wireless customer network 120-2, such as a long term evolution (LTE) network). Control network 120-3 may be a control network associated with controlling the set of data centers 125.

Connections 140 may permit devices associated with each network (e.g., user devices (not shown)) to communicate with data center 125-1 (an active data center). For example, user devices may connect to data center 125-1, via wired customer network 120-1 and wired customer network DNS device 115-1, using DNS based connection 140-1. Additionally, or alternatively, user devices may connect to data center 125-1, via wireless customer network 120-2 and wireless customer network DNS device 115-2, using DNS based connection 140-2. That is, data center 125-1 may be a first data center in a group of data centers that is associated with receiving traffic from multiple devices of multiple networks. In another example, control network 120-3 may have a persistent connection 140-3 to data center 125-1. In some implementations, data centers 125 may be in active/standby or in active/active operating modes. For example, data centers 125 may operate in a configuration where data center 125-1 is an active data center to which network traffic is being directed and data center 125-2 is a standby data center to which network traffic is not being directed. As another example, both data centers 125-1 and 125-2 are active data centers to which network traffic is being directed based on a load balancer or the like. In some implementations, data centers 125 may include synchronized databases (e.g., data may be consistent across both data centers 125).

Figure 1B:
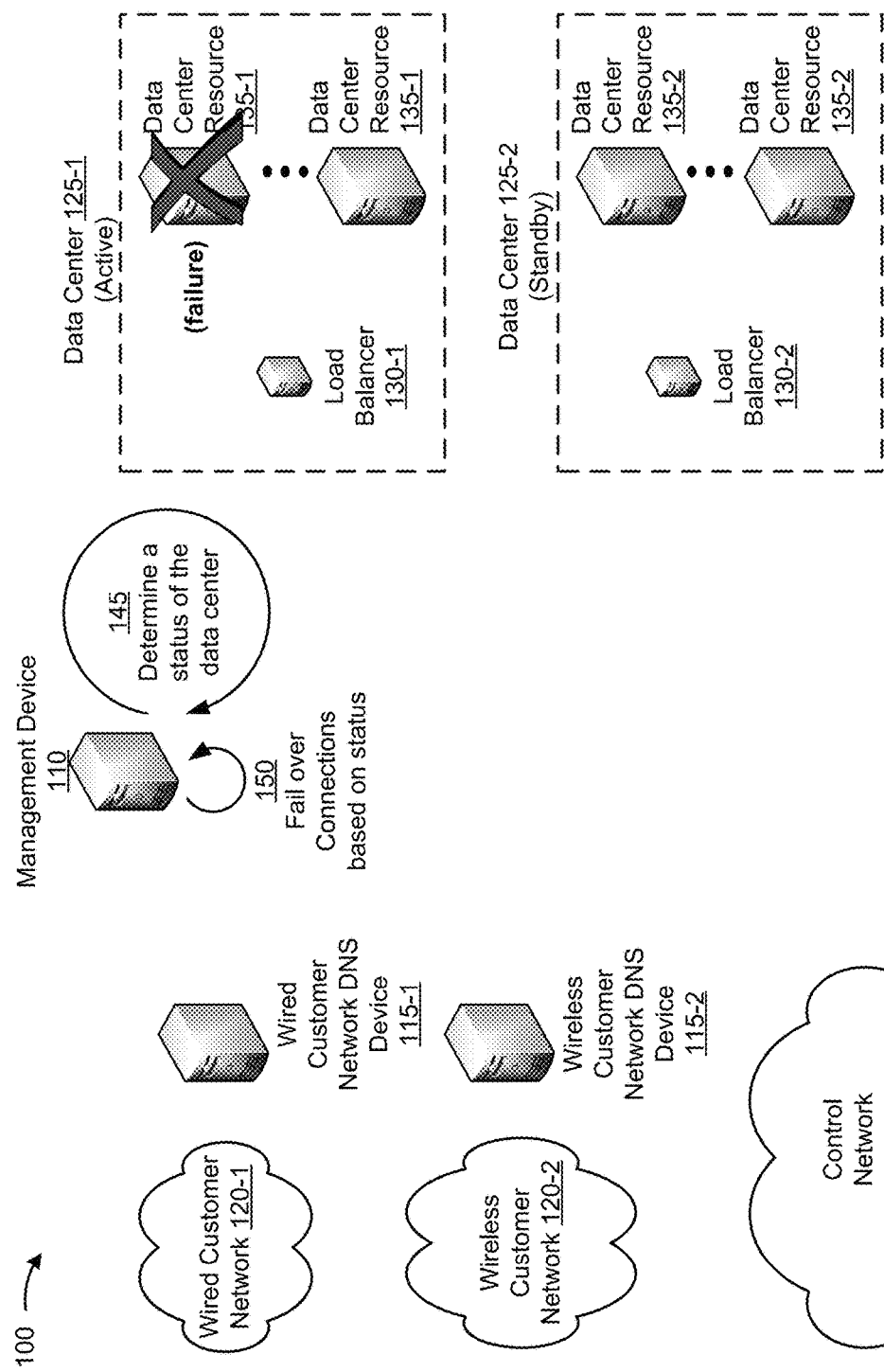

As shown in FIG. 1B, and by reference number 145, management device 110 may determine a status of a first data center (e.g., data center 125-1) of a group of data centers (e.g., a group of data centers including data center 125-1 and data center 125-2). In some implementations, management device 110 may determine the status of the first data center by monitoring the first data center. For example, management device 110 may determine whether the user devices are connecting successfully to data center 125-1 or receiving errors when attempting to connect. In some implementations, management device 110 may determine the status in multiple ways. For example, management device 110 may connect to load balancer 130 and/or a particular data center resource 135 to determine whether load balancer 130 or the particular data center resource 135 is operating. In some implementations, management device 110 may determine a status of multiple network devices of data center 125, such as load balancers 130, data center resources 135, or the like, and may identify an issue when greater than a threshold percentage of network devices are associated with an error. Further, management device 110 may attempt to connect to data centers 125-1 through wired customer network 120-1 or wireless customer network 120-2 to determine whether data centers 125-1, wired customer network DNS device 115-1, and/or wireless customer network DNS device 115-2 are operating correctly.

As shown by reference number 150, management device 110 may determine to fail over from data center 125-1 to data center 125-2 based on the status of data center 125-1. For example, management device 110 may determine to fail over based on determining that data center 125-1 is associated with an unhealthy status (e.g., a situation in which one or more load balancers 130-1 and/or data center resources 135-1 are determined not to be operating). In the example of FIG. 1B, management device 110 may determine that data center resource 135-1 has failed (e.g., is associated with an unhealthy status or error).

Figure 1C:
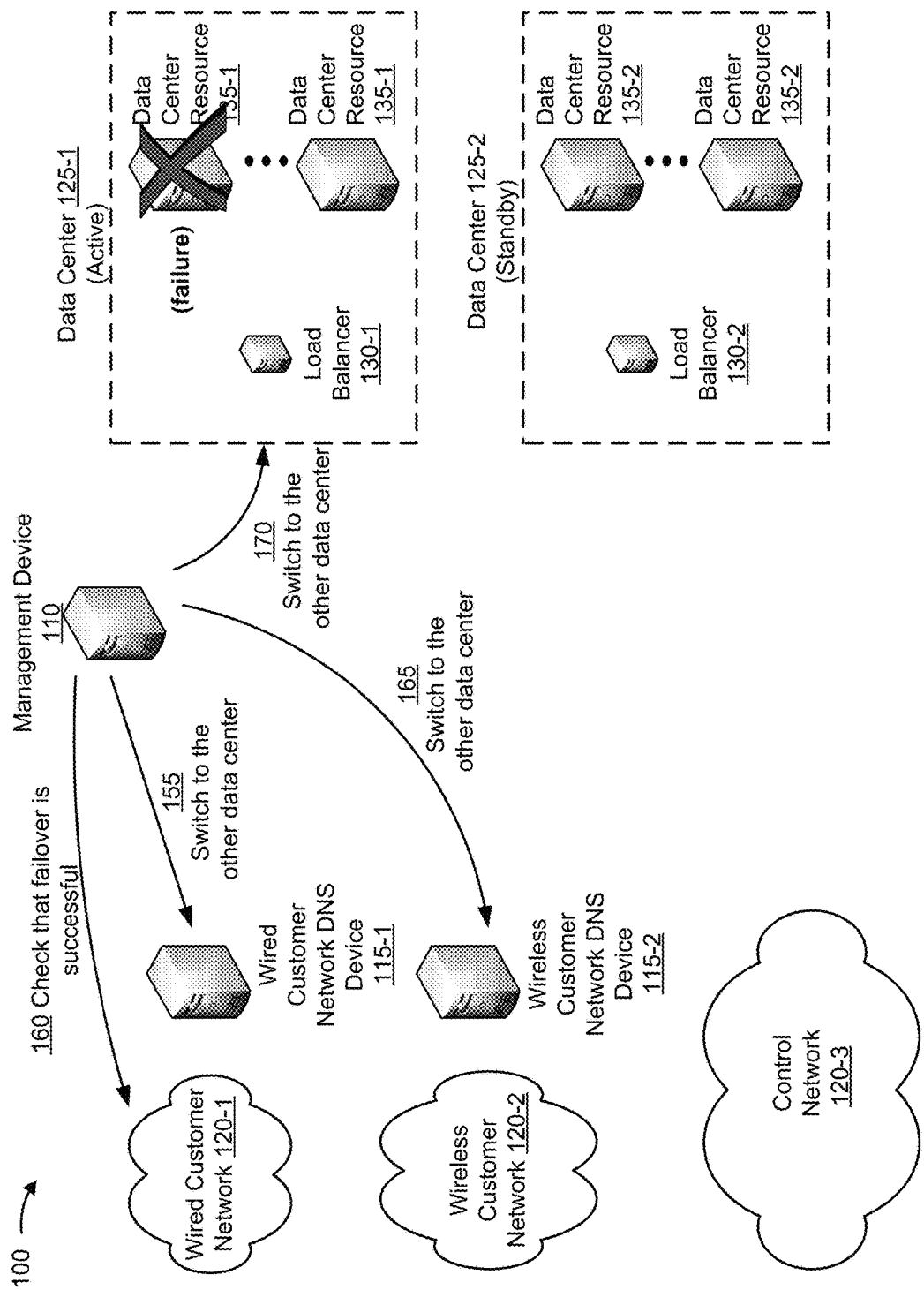

As shown in FIG. 1C, and by reference number 155, management device 110 may transmit information to wired customer network DNS device 115-1 to cause network traffic associated with wired customer network 120-1 to be directed to data center 125-2. For example, management device 110 may provide an instruction to update or alter wired customer network DNS device 115-1 to translate uniform resource locators (URLs) to IP addresses associated with data center 125-2 rather than data center 125-1. The updating or altering of wired customer network DNS device 115-1 may cause external DNS servers of wired customer network 120-1 to be prevented from utilizing wired customer network DNS device 115-1 to route to data center 125-1. Instead, external DNS servers of wired customer network 120-1 may utilize wired customer network DNS device 115-1 to route to data center 125-2. For example, DNS entries of the external DNS servers of wired customer network 120-1 may be altered such that network traffic from user devices is routed to data center 125-2. In some implementations, wired customer network DNS device 115-1 may be updated when a time to live (TTL) value expires. For example, based on being configured with a relatively low TTL value, wired customer network DNS device 115-1 may be caused to obtain a set of replacement DNS entries to replace a set of stored DNS entries, which may cause wired customer network DNS device 115-1 to direct network traffic to data center 125-2 based on the set of replacement DNS entries.

As shown by reference number 160, management device 110 may perform a check to determine that wired customer network DNS device 115-1 successfully updated routing for wired customer network 120-1 (e.g., by attempting to connect to data center 125-2 via wired customer network 120-1). In the example shown, management device 110 determines that routing for wired customer network DNS device 115-1 was successfully updated. In another example, if the update is not successful, management device 110 may transmit an alert indicating that the update was not successful (e.g., to a user device of a network administrator). Additionally, or alternatively, management device 110 may retry updating wired customer network DNS device 115-1. In some implementations, management device 110 may abort failover and may roll back wired customer network DNS device 115-1 to cause traffic to be routed to data center 125-1 based on determining a failure associated with updating wired customer network DNS device 115-1.

As shown by reference number 165, management device 110 may transmit information to wireless customer network DNS device 115-2 to cause traffic from wireless customer network 120-2 to be directed to data center 125-2. For example, management device 110 may cause DNS entries of wireless customer network DNS device 115-2 to be updated to cause network traffic to be routed toward data center 125-2. Further, management device 110 may perform a check to determine whether wireless customer network DNS device 115-2 has been successfully updated, as described above with respect to reference number 160 for wired customer network DNS device 115-1. In this way, the routing of traffic from user devices of wired customer network 120-1 and wireless customer network 120-2 to data center 125-1 is ceased for a particular period of time (e.g., while data center 125-1 is being repaired).

As shown by reference number 170, management device 110 may transmit an instruction to load balancer 130-1, associated with data center 125-1, to switch to directing traffic to data center 125-2. For example, management device 110 may cause load balancer 130-1 to redirect network traffic to data center 125-2 rather than direct the network traffic toward a computing resource of data center 125-1. In this way, management device 110 performs failover for legacy networks utilizing a persistent connection. In another example, control network 120-3 may utilize a load balancer, and management device 110 may cause the load balancer of control network 120-3 to switch to utilizing a persistent connection to data center 125-2. In this way, management device 110 causes control network 120-3 to transmit traffic to data center 125-2 after a failover of data center 125-1 to data center 125-2.

Figure 1D:
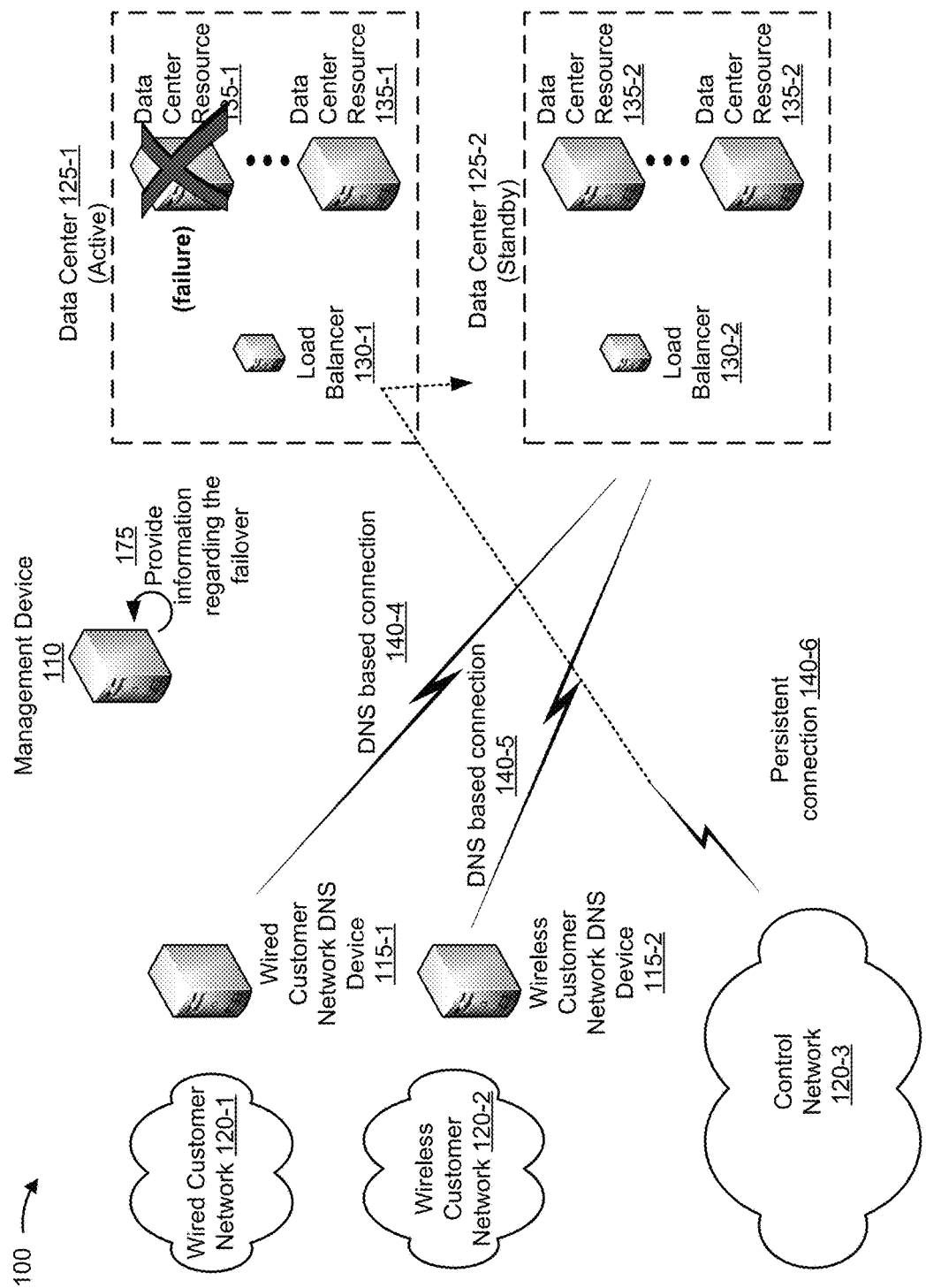

As shown in FIG. 1D, newly established connections 140-4, 140-5, and 140-6 to data center 125-2 may permit user devices of wired customer network 120-1, wireless customer network 120-2, and control network 120-3 to connect to data center 125-2 rather than 125-1. As shown by reference number 175, management device 110 may provide information regarding the failover, such as a report that the failover occurred, information identifying an event that triggered the failover (e.g., an error with data center resources 135-1 and/or wireless customer network 120-2), an indication that failover was successful, or the like. As a result, management device 110 synchronizes data center failovers for multiple networks, which may reduce network interruption. Moreover, management device 110 performs failover for both a DNS translation based connection and a load balancer based persistent connection.

As indicated above, FIGS. 1A-1D are provided merely as an example. Other examples are possible and may differ from what was described with regard to FIGS. 1A-1D.

Figure 2:
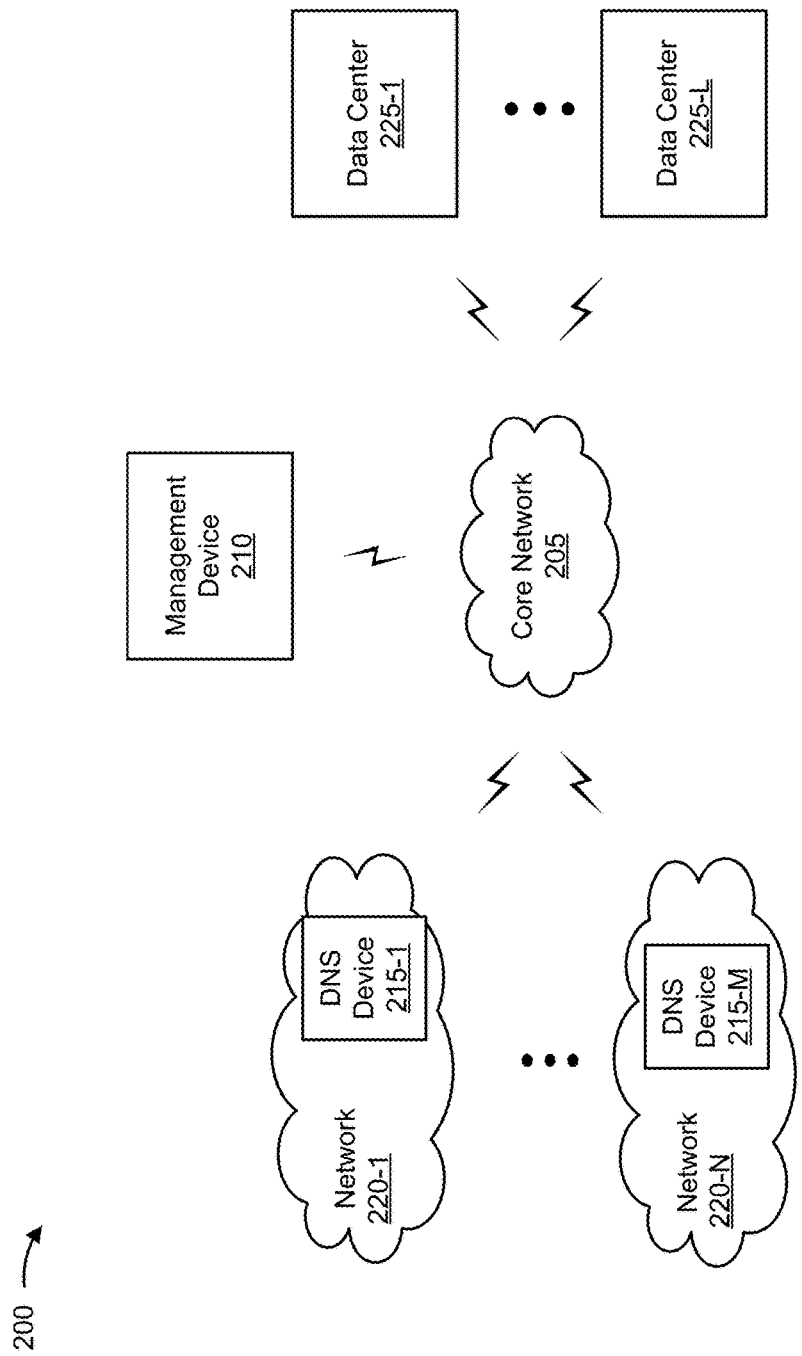
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a core network 205, a management device 210, one or more domain name server (DNS) devices 215-1 through 215-M (M≥1) (hereinafter referred to collectively as "DNS devices 215," and individually as "DNS device 215"), one or more networks 220-1 through 220-N (N≥1) (hereinafter referred to collectively as "networks 220," and individually as "network 220"), and one or more data centers 225-1 through 225-L (L≥1) (hereinafter referred to collectively as "data centers 225," and individually as "data center 225"). Devices of environment 200 may interconnect via wired connections, wireless connections, or a combination of wired and wireless connections.

Core network 205 includes one or more wired and/or wireless networks. For example, core network 205 may include a core network, such as a backbone network of a telecom service provider, an internet service provider, or the like. In some implementations, core network 205 may include an Internet protocol/multiprotocol label switching (IP/MPLS) backbone network, a border gateway protocol (BGP) based routing network, or the like. In some implementations, core network 205 may include a fiber optic-based network, a cloud computing network, or the like, and/or a combination of these or other types of core networks.

Management device 210 includes one or more devices capable receiving, generating, storing, processing, and/or providing information, such as information associated with causing a failover from a first data center 225 to a second data center 225. For example, management device 210 may include a server, a client device, a user device, or the like. Management device 210 may monitor a status of a data center 225 and cause an alteration to a network configuration (e.g., a DNS table or a load balancer configuration) to alter routing of network traffic between a particular network 220 and a particular data center 225. In some implementations, management device 210 corresponds to management device 110 shown in FIGS. 1A-1D.

DNS device 215 includes one or more devices capable receiving, generating, storing, processing, and/or providing information associated with directing network traffic to a particular data center 225. For example, DNS device 215 may include a server or a similar type of device. DNS device 215 may provide information to translate a URL or another type of identifier to an IP address, a port identifier, or the like, of a particular data center 225. In some implementations, DNS device 215 may be a service provided by data center 225 (e.g., a virtualized service). In some implementations, DNS device 215 corresponds to one or more DNS devices 115 shown in FIGS. 1A-1D.

Network 220 may include one or more wired and/or wireless networks. For example, network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, environment 200 may include multiple types of network 220, such as a wired network 220, a wireless network 220, an intranet network 220, or the like.

Data center 225 includes one or more devices capable receiving, generating, storing, processing, and/or providing information relating to a network traffic transmitted between data center 225 and network 220. For example, data center 225 may include a collection of computing resources (e.g., servers or processors), routing resources (e.g., gateways, switches, or hubs), storage resources (e.g., data structures or data repositories), or the like. In some implementations, one or more routing resources of data center 225 may utilize border gateway protocol (BGP). In some implementations, data center 225 may provide a virtualized DNS device 215 (e.g., a DNS service for routing toward data center 225). In some implementations, data center 225 may set a time to live value, associated with a DNS entry of DNS device 215, to a small time to live value relative to another DNS for which an update is not utilized to cause a fail over form a first data center 225 to a second data center 225. In some implementations, data center 225 may include a cloud computing data center. In some implementations, data center 225 corresponds to one or more data centers 125 shown in FIGS. 1A-1D.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
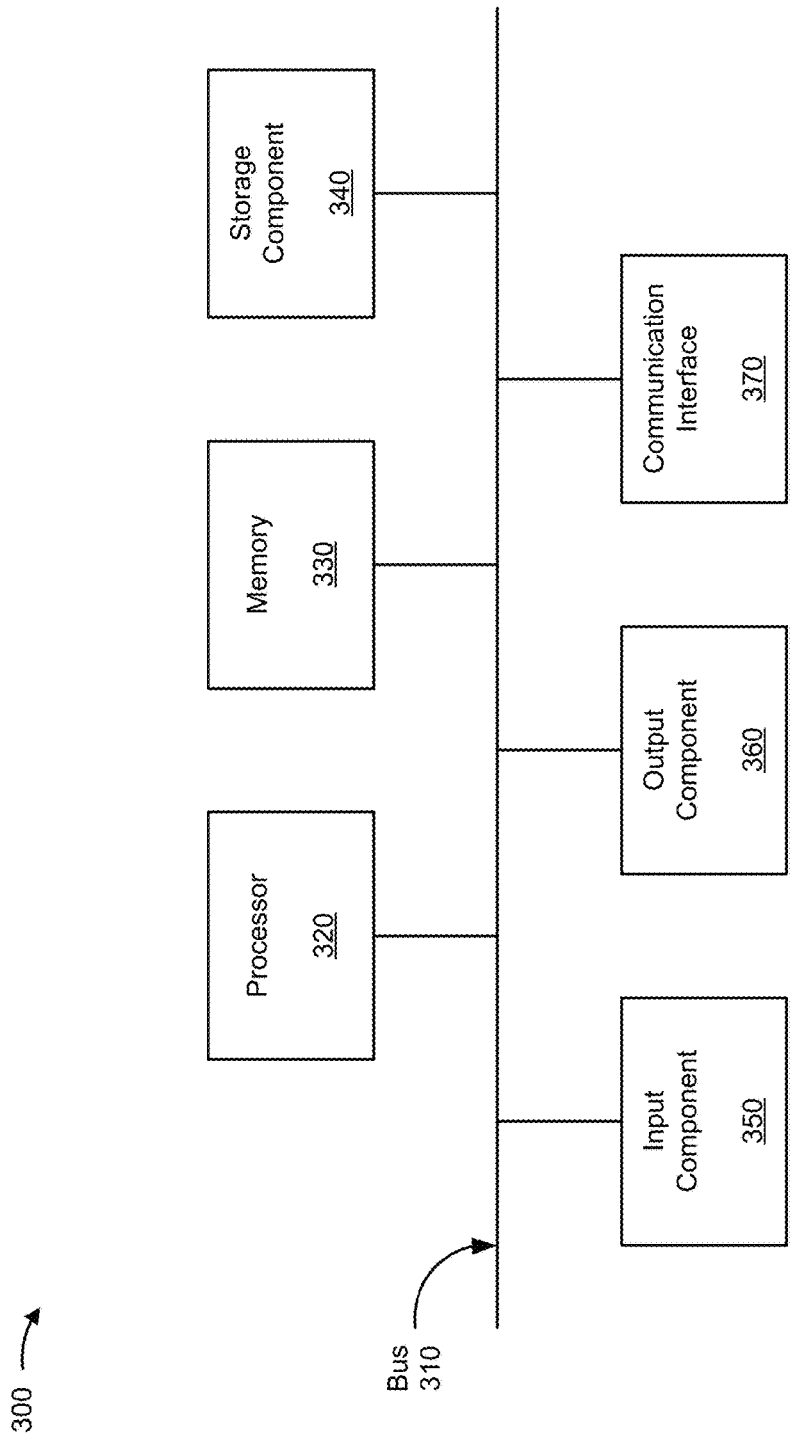
FIG. 3 is a diagram of example components of one or more devices of FIG. 2.

FIG. 3 is a diagram of example components of a device 300. Device 300 may correspond to management device 210, DNS device 215, and/or one or more devices of data center 225 (e.g., a load balancer, a data center resource, or the like). In some implementations, management device 210, DNS device 215, and/or one or more devices of data center 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
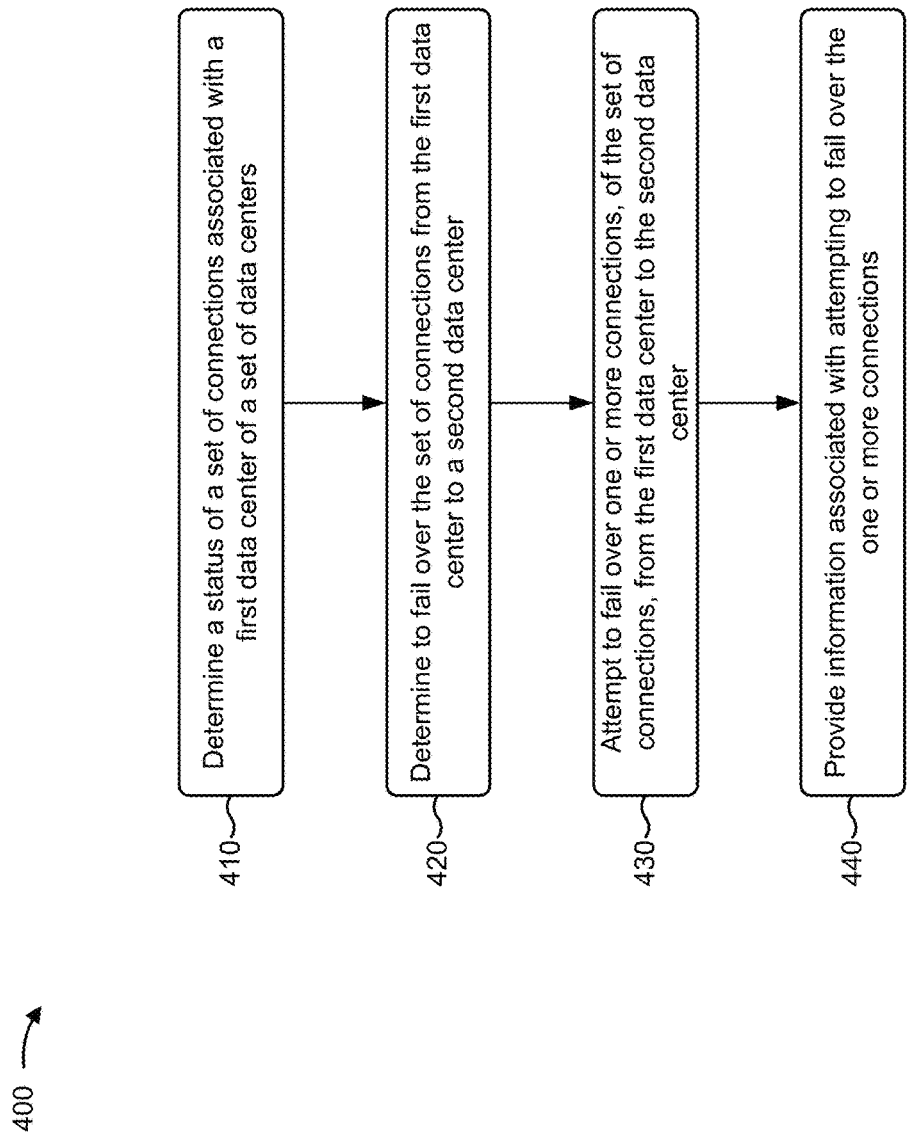
FIG. 4 is a flow chart of an example process for failing over multiple networks from a first data center to a second data center.

FIG. 4 is a flow chart of an example process 400 for failing over multiple networks from a first data center to a second data center. In some implementations, one or more process blocks of FIG. 4 may be performed by management device 210. In some implementations, one or more process blocks of FIG. 4 may be performed by another device or a group of devices separate from or including management device 210, such as DNS device 215 and/or one or more devices of data center 225.

As shown in FIG. 4, process 400 may include determining a status of a set of connections associated with a first data center of a set of data centers (block 410). For example, management device 210 may determine a status of the set of connections associated with the first data center 225 of the set of data centers 225. In some implementations, management device 210 may query first data center 225 (e.g., may perform an API call or transmit data to first data center 225) to determine whether first data center 225 is active or on standby. For example, management device 210 may determine that first data center 225 is in an active mode, and may determine a status relating to whether to perform a fail over from first data center 225 based on determining that first data center 225 is in the active mode. Additionally, or alternatively, when management device 210 determines that a particular data center 225 is in a standby mode, management device 210 may determine a status relating to whether the particular data center 225 is capable of receiving network traffic after a failover from first data center 225.

In some implementations, management device 210 may determine a health status of an active first data center 225. For example, management device 210 may determine a health status related to whether first data center 225 satisfies threshold criteria for remaining active. For example, when first data center 225 is associated with a threshold quantity of alarms being triggered (e.g., computing resources being inactive, routing resources being inactive, or errors being detected), then services may become impacted, and management device 110 may determine that first data center 225 should no longer be active. In some implementations, management device 210 may determine health of a standby data center 225 (e.g., whether a second data center 225 can become active when an active first data center 225 fails).

In some implementations, management device 210 may determine a status of first data center 225 for a set of connections associated with a set of networks 220 that are utilized to access the first data center 225 (e.g., the Internet, a wireless communication network, an intranet, or a private network). For example, when a particular network 220 utilizes a particular DNS device 215 (e.g., a DNS service) to route network traffic from a group of user devices to first data center 225, management device 210 may determine whether network traffic is being corrected routed to first data center 225. In this case, management device 210 may connect to the particular network 220, attempt to transmit network traffic to first data center 225, and may determine whether the traffic was received by first data center 225. In this way, management device 210 may determine whether address translation associated with the particular DNS device 215 is operating correctly.

In some implementations, management device 210 may perform an API call on DNS device 215 to determine whether DNS device 215 is configured to direct network traffic to first data center 225. For example, management device 210 may transmit a message to DNS device 215 to obtain information regarding a set of DNS entries of DNS device 215, and may determine whether the set of DNS entries match an expected set of DNS entries associated with causing traffic to be directed to data center 225.

In some implementations, management device 210 may determine a status relating to a load balancer associated with first data center 225. For example, when network 220 utilizes a persistent connection to first data center 225, management device 210 may determine whether a load balancer associated with network 220 and/or first data center 225 traffic to be routed between network 220 and a computing resource of first data center 225.

In some implementations, management device 210 may determine a status relating to one or more computing resources of first data center 225. For example, management device 210 may determine whether a load balancer of first data center 225 is operating to perform load balancing for first data center 225. Similarly, management device 210 may determine whether a computing resource (e.g., a node) of first data center 225 is operating to process network traffic directed to the computing resource by a user device of connected to network 220.

In some implementations, management device 210 may determine that the status of first data center 225 is healthy (e.g., operating within acceptable operating parameters). For example, management device 210 may determine that first data center 225 is healthy based on determining that each connection, of the set of connections for a set of networks 220, is routing network traffic to first data center 225 (e.g., within a particular time period). Additionally, or alternatively, management device 210 may determine that first data center 225 is healthy based on determining that computing resources of first data center 225 are operating properly. Additionally, or alternatively, management device 210 may transmit data to first data center 225 and/or perform an API call of an API relating to first data center 225 to determine whether first data center 225 is healthy or unhealthy.

In some implementations, management device 210 may determine that first data center 225 is not healthy based on detecting an outage associated with a connection between a particular network 220 and first data center 225. Additionally, or alternatively, management device 210 may determine that first data center 225 is not healthy based on detecting an error relating to a threshold quantity of load balancers or other computing resources of first data center 225. Additionally, or alternatively, management device 210 may determine that first data center 225 is not healthy using another technique.

As further shown in FIG. 4, process 400 may include determining to fail over the set of connections from the first data center to a second data center (block 420). For example, management device 210 may determine to fail over the set of connections from the first data center 225 to the second data center 225. In some implementations, management device 210 may determine to fail over the set of connections from the first data center 225 to a second data center 225 when a set of threshold criteria for failover is satisfied. For example, management device 210 may determine to fail over when management device 210 determines that first data center 225 is not healthy based on a threshold quantity of errors relating to resources of first data center 225. Additionally, or alternatively, management device 210 may receive information indicating that first data center 225 is to be failed over, such as a threshold quantity of alarms being triggered for first data center 225, a threshold quantity of customer complaints regarding first data center 225, or the like. Additionally, or alternatively, management device 210 may detect an interaction with a user interface associated with causing management device 210 to fail over the set of connections from first data center 225 to second data center 225 (e.g., operator input requesting fail over). In some implementations, management device 210 may determine that a threshold quantity of persistent connections are associated with a failure (e.g., are disconnected), a threshold quantity of computing resources are associated with a failure (e.g., a threshold quantity of load balancers or servers are not operating), or the like.

As further shown in FIG. 4, process 400 may include attempting to fail over one or more connections, of the set of connections, from the first data center to the second data center (block 430). For example, management device 210 may attempt to fail over one or more connections, of the set of connections, from first data center 225 to second data center 225. In some implementations, management device 210 may determine an order of the one or more connections relating to the one or more networks 220 connected to first data center 225. For example, management device 210 may select a first connection associated with a first network 220 based on triggering the failover based on an issue with the first network 220, and may fail over the first connection to second data center 225. In this case, management device 210 may subsequently select one or more other connections associated with one or more other networks 220, and may fail over the one or more other connections to second data center 225 subsequent to failing over the first connection.

In some implementations, management device 210 may attempt to fail over a first connection of the one or more connections. For example, for a network 220 utilizing a DNS device 215 (e.g., external to data centers 225), management device 210 may trigger a DNS update for DNS device 215 and/or may alter one or more DNS entries of DNS device 215 associated with network 220. In this case, management device 210 may trigger a DNS update to cause DNS device 215 to switch from utilizing a first group of DNS entries associated with first data center 225 to utilizing a second group of DNS entries associated with second data center 225. Additionally, or alternatively, for a network utilizing a DNS service provided by first data center 225 and/or second data center 225, management device 210 may alter records (e.g., DNS entries) of the DNS service to cause the DNS service translate URLs to IP addresses associated with second data center 225 rather than first data center 225. Management device 210 may transmit one or more instructions to trigger the DNS update(s) and/or to cause alteration of the one or more DNS entries.

In some implementations, management device 210 may alter a configuration of first data center 225 and/or second data center 225 to attempt to fail over to second data center 225. For example, management device 210 may cause second data center 225 to switch from a standby configuration to an active configuration and/or may cause first data center 225 to switch an active configuration to a standby configuration. Management device 210 may transmit one or more instructions to cause data center(s) 225 to switch configurations.

In some implementations, management device 210 may cause external DNS device 215 (e.g., a DNS device 215 associated with network 220 rather than with first data center 225) to obtain an updated set of DNS entries. For example, when a relatively short (e.g., less than a threshold) TTL value is assigned to DNS entries provided to the external DNS device 215, external DNS device 215 is caused to request updated DNS entries within a threshold period of time, and management device 210 may cause updated DNS entries to be provided to cause network traffic to be routed to second data center 225.

In some implementations, for a network 220 utilizing a persistent connection to first data center 225, management device 210 may connect to a load balancer of first data center 225, and may provide an instruction to cause the load balancer to redirect network traffic to second data center 225. Additionally, or alternatively, management device 210 may connect to a load balancer of the network 220 (e.g., which may be utilizing the persistent connection to first data center 225), to cause the load balancer to utilize another persistent connection to second data center 225. Additionally, or alternatively, management device 210 may cause a load balancer of first data center 225 to redirect network traffic to a load balancer of second data center 225.

In some implementations, management device 210 may determine whether failover succeeded for a first connection before proceeding to attempt to fail over an additional connection. In some implementations, management device 210 may determine whether failover has succeeded based on testing (e.g., a simulated DNS lookup), receiving an API response from an API of DNS device 215, or the like. If failover did not succeed, management device 210 may attempt a roll back to first data center 225 and may not attempt a failover to second data center 225 for one or more other connections and/or networks. If failover is successful, management device 210 may proceed to fail over another connection associated with another network 220. For example, management device 210 may update another DNS service, associated with another connection, and may determine whether updating the other DNS service successfully failed over the subsequent connection. In some implementations, management device 210 may determine that failover is successful when no issues have been detected within a threshold period of time (e.g., two minutes).

As further shown in FIG. 4, process 400 may include providing information associated with attempting to fail over the one or more connections (block 440). For example, management device 210 may provide information associated with attempting to fail over the one or more connections. In some implementations, management device 210 may provide information indicating that failover was successful. For example, management device 210 may provide information indicating the failover from first data center 225 to second data center 225. In some implementations, management device 210 may provide information indicating that the attempt to fail over the one or more connections was not successful. In this case, management device 210 may attempt a rollback of the failover, and may indicate whether an attempted rollback of the failover was successful.

In some implementations, management device 210 may transmit an alert to a user device (e.g., utilized by a network manager). For example, management device 210 may transmit an alert indicating that the failover was unsuccessful and recommending a course of action (e.g., to roll back the failover or to reattempt the failover). In some implementations, management device 210 may provide information indicating that the attempt to fail over was successful. For example, management device 210 may indicate a cause of the failover. Additionally, or alternatively, management device 210 may indicate a time of the failover. Additionally, or alternatively, management device 210 may provide information identifying a length of time that elapsed from detection to successful failover to permit diagnostics to be performed on management device 210, DNS device 215, and/or first data center 225.

In some implementations, management device 210 may revert the failover after successfully performing the failover. For example, after a threshold period of time has elapsed from failing over from first data center 225 to second data center 225, management device 210 may update one or more DNS devices 215 to cause traffic to resume being directed to first data center 225.

In some implementations, management device 210 may provide information associated with overriding a subsequent failover for a threshold period of time (e.g., an override that prevents a repeated failover between first data center 225 and second data center 225). For example, after attempting or triggering a failover, management device 210 may store information associated with stopping a failover even when triggered. In some implementations, management device 210 may undo an override. For example, when failover is determined to have occurred based on a non-recurring condition (e.g., a physical connection being physically damaged and/or another scenario that is relatively unlikely to occur repetitively within a relatively short period of time), management device 210 may undo the overriding to allow a subsequent failover within a threshold period of time. In this way, management device 210 reduces a quantity of failovers that occur relative to permitting a subsequent failover after a first failover. Further, utilization of computing resources associated with performing a failover is reduced, and a likelihood of data loss is reduced based on reducing a quantity of failovers that occur.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, management device 210 synchronizes failover of multiple networks via DNS alteration and/or load balancer configuration to reduce an amount of time to failover the multiple networks and to reduce a likelihood of a network failing to be failed over to the second data center 225 relative to another technique for failover. Moreover, management device 210 improves network performance for user devices connecting to data centers 225 via the multiple networks 220. Further, utilization of DNS alteration rather than load balancer configuration causes network traffic to be directed to the second data center 225 rather than being directed to the first data center 225 and subsequently redirected to the second data center 225. As a result, a number of hops by the network traffic is reduced, thereby reducing network load, reducing a likelihood of packet loss, and improving network performance.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
    one or more processors to:
        monitor a status of a first data center of a group of data centers,
            the first data center, of the group of data centers, being associated with receiving network traffic from a plurality of networks;
        determine, based on the status of the first data center, to cause a failover from the first data center, of the group of data centers, to a second data center of the group of data centers;
        cause a domain name server (DNS) configuration, associated with an external DNS, to be altered to cause a first plurality of devices, of a first network of the plurality of networks, to route a first portion of the network traffic to the second data center of the group of data centers,
            the external DNS being external to the group of data centers;
        cause a set of DNS entries, associated with an internal DNS, to be altered to cause a second plurality of devices, of a second network of the plurality of networks, to route a second portion of the network traffic to the second data center of the group of data centers,
            the internal DNS being internal to the group of data centers;
        cause a load balancer configuration, associated with a load balancer of the first data center, to be altered to cause a third portion of the network traffic, associated with a third plurality of devices, of a third network of the plurality of networks, to be redirected from the first data center to the second data center; and
        determine whether the failover is successful based on testing the internal DNS and receiving a response from the internal DNS and based on determining whether the network traffic is being routed to the second data center.

2. The device of claim 1, where the one or more processors are further to:
    determine, based on monitoring the status of the first data center, a failure associated with a threshold quantity of persistent connections associated with a particular network of the plurality of networks; and
    where the one or more processors, when determining to cause the failover, are to:
        determine to cause the failover based on determining the failure associated with the threshold quantity of persistent connections.

3. The device of claim 1, where the one or more processors, when determining whether the failover is successful, are to:
    determine a failure associated with altering the set of DNS entries; and
    where the one or more processors are further to:
        roll back the set of DNS entries to cause subsequent network traffic to be routed to the first data center based on determining the failure.

4. The device of claim 1, where the one or more processors, when monitoring the status of the first data center, are to:
    cause information to be transmitted, via a particular network of the plurality of networks, toward the group of data centers;
    determine that the information failed to be routed to the first data center based on transmitting the information toward the group of data centers; and
    where the one or more processors, when determining to cause the failover, are to:
        determine to cause the failover based on determining that the information failed to be routed to the first data center.

5. The device of claim 1, where the one or more processors are to:
    determine that a threshold quantity of computing resources of the first data center are associated with a failure; and
    where the one or more processors, when determining to cause the failover, are to:
        determine to cause the failover based on determining that the threshold quantity of computing resources are associated with the failure.

6. The device of claim 1, where the one or more processors are further to:
    override another failover from the second data center to another data center, of the group of data centers, after altering the set of DNS entries.

7. The device of claim 1, where the plurality of networks includes at least one of:
    a wired customer network,
    a wireless customer network, or
    a control network.

8. The device of claim 1, where the internal DNS is a DNS service provided by a particular data center of the group of data centers; and
    where causing the set of DNS entries to be altered comprises:
        causing an updated DNS entry to be included in the set of DNS entries, of the DNS service,
            the updated DNS entry being associated with the second data center.

9. A non-transitory computer-readable medium storing instructions, the instructions comprising:
one or more instructions that, when executed by one or more processors, cause the one or more processors to:
determine, for a first data center of a group of data centers, that a condition associated with causing a failover from the first data center to a second data center, of the group of data centers, is satisfied,
the first data center, of the group of data centers, being associated with receiving network traffic from a plurality of networks;
cause a domain name server (DNS) configuration, associated with an external DNS, to be altered to cause a first plurality of devices, of a first network of the plurality of networks, to route a first portion of the network traffic to the second data center of the group of data centers,
the external DNS being external to the group of data centers;
cause a set of DNS entries, associated with an internal DNS, to be altered to cause a second plurality of devices, of a second network of the plurality of networks, to route a second portion of the network traffic to the second data center of the group of data centers,
the internal DNS being internal to the group of data centers;
cause a load balancer configuration, associated with a load balancer of the first data center, to be altered to cause a third portion of the network traffic, associated with a third plurality of devices, of a third network of the plurality of networks, to be redirected from the first data center to the second data center; and
determine whether the failover is successful based on testing the internal DNS and receiving a response from the internal DNS and based on determining whether the network traffic is being routed to the second data center.

10. The non-transitory computer-readable medium of claim 9, where the one or more instructions, when executed by the one or more processors, further cause the one or more processors to:
transmit a particular quantity of network traffic to the group of data centers prior to determining that the condition associated with causing the failover is satisfied;
determine, based on transmitting the particular quantity of network traffic to the group of data centers, that the first data center is associated with an unhealthy status; and
where the one or more instructions, that cause the one or more processors to determine that the condition associated with causing the failover is satisfied, cause the one or more processors are to:
determine that the condition associated with causing the failover is satisfied based on determining that the first data center is associated with the unhealthy status.

11. The non-transitory computer-readable medium of claim 10, where the one or more instructions, that cause the one or more processors to determine that the first data center is associated with the unhealthy status, cause the one or more processors to:
determine that the particular quantity of network traffic failed to be received at the first data center; and
determine that the first data center is associated with the unhealthy status based on determining that the particular quantity of network traffic failed to be received at the first data center.

12. The non-transitory computer-readable medium of claim 10, where the one or more instructions, that cause the one or more processors to determine that the first data center is associated with the unhealthy status, cause the one or more processors to:
determine that a computing resource of the first data center failed to correctly respond to the particular quantity of network traffic; and
determine that the first data center is associated with the unhealthy status based on determining that the computing resource of the first data center failed to correctly respond to the particular quantity of network traffic.

13. The non-transitory computer-readable medium of claim 9, where the first data center is associated with an active configuration and the second data center is associated with a standby configuration; and
where the one or more instructions, when executed by the one or more processors, cause the one or more processors to:
cause the second data center to be transferred to the active configuration.

14. The non-transitory computer-readable medium of claim 9, where the one or more instructions, when executed by the one or more processors, further cause the one or more processors to:
override a subsequent failover for a threshold period of time.

15. A method, comprising:
monitoring, by a device, a status of a first data center of a group of data centers,
the first data center, of the group of data centers, being associated with receiving network traffic from a plurality of devices of a plurality of networks;
determining, by the device and based on the status of the first data center, to cause a failover from the first data center, of the group of data centers, to a second data center of the group of data centers;
causing, by the device, a domain name server (DNS) configuration, associated with an external DNS, to be altered to cause a first plurality of devices, of a first network of the plurality of networks, to route a first portion of the network traffic to the second data center of the group of data centers,
the external DNS being external to the group of data centers;
causing, by the device, a set of DNS entries, associated with an internal DNS, to be altered to cause a second plurality of devices, of a second network of the plurality of networks, to route a second portion of the network traffic to the second data center of the group of data centers, the internal DNS being internal to the group of data centers;
causing, by the device, a load balancer configuration, associated with a load balancer of the first data center, to be altered to cause a third portion of the network traffic, associated with a third plurality of devices, of a third network of the plurality of networks, to be redirected from the first data center to the second data center; and
determining, by the device, whether the failover is successful based on testing the internal DNS and receiving a response from the internal DNS and based on determining whether the network traffic is being routed to the second data center.

16. The method of claim 15, where monitoring the status of the first data center comprises:
    performing an application programming interface (API) call to an API associated with the first data center to determine the status of the first data center.

17. The method of claim 15, where monitoring the status of the first data center comprises:
    transmitting data toward the first data center via a particular network of the plurality of networks; and
    identifying the status of the first data center based on transmitting the data toward the first data center via the particular network.

18. The method of claim 15, further comprising:
    determining, after causing the DNS entries to be altered, that a threshold period of time has elapsed;
    determining that the first data center is associated with a healthy status after determining that the threshold period of time has elapsed; and
    causing another alteration to the DNS entries to cause network traffic to be directed toward the first data center based on determining that the first data center is associated with the healthy status.

19. The non-transitory computer-readable medium of claim 9, where the one or more instructions, that cause the one or more processors to determine whether the failover is successful, cause the one or more processors to:
    determine a failure associated with altering the set of DNS entries and
    where the one or more instructions, when executed by the one or more processors, cause the one or more processors to:
        roll back the set of DNS entries to cause subsequent network traffic to be routed to the first data center based on determining the failure.

20. The method of claim 15, where determining whether the failover is successful comprises:
    determining a failure associated with altering the set of DNS entries; and further comprising:
    rolling back the set of DNS entries to cause subsequent network traffic to be routed to the first data center based on determining the failure.

* * * * *